United States Patent
Knoeppel

(10) Patent No.: US 9,012,568 B2
(45) Date of Patent: *Apr. 21, 2015

(54) METHODS OF MAKING STYRENIC POLYMERIC COMPOSITIONS AND METHODS OF USING SAME

(75) Inventor: David Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/267,032

(22) Filed: Oct. 6, 2011

(65) Prior Publication Data

US 2012/0245285 A1    Sep. 27, 2012

Related U.S. Application Data

(63) Continuation of application No. 12/357,905, filed on Jan. 22, 2009, now Pat. No. 8,063,139.

(51) Int. Cl.
| | | |
|---|---|---|
| *C08L 9/00* | (2006.01) | |
| *C08F 12/08* | (2006.01) | |
| *C08F 279/02* | (2006.01) | |
| *C08K 5/098* | (2006.01) | |

(52) U.S. Cl.
CPC ............... *C08F 279/02* (2013.01); *C08K 5/098* (2013.01)

(58) Field of Classification Search
CPC ........ C08F 12/02; C08F 12/08; C08F 212/08; C08F 279/02; C08L 25/02; C08L 25/06; C08L 25/08; C08L 25/16; C08L 51/04; C08L 9/00; C08K 5/098

USPC ................. 524/504, 700, 773, 779, 849, 879; 525/53, 54, 232, 241, 242, 244, 316, 525/262; 526/65, 67, 68, 227, 232.5, 216

See application file for complete search history.

(56) References Cited

U.S. PATENT DOCUMENTS

| 4,451,612 | A | * | 5/1984 | Wang et al. ............... 525/53 |
|---|---|---|---|---|
| 4,567,232 | A | * | 1/1986 | Echte et al. ............... 525/53 |
| 4,857,587 | A | * | 8/1989 | Sosa et al. ............... 525/53 |
| 4,861,827 | A | * | 8/1989 | Sosa et al. ............... 525/54 |
| 6,060,545 | A | * | 5/2000 | Gilg ............... 524/199 |
| 6,770,716 | B1 | | 8/2004 | Sosa et al. |
| 7,271,212 | B2 | * | 9/2007 | Oguni et al. ............... 524/442 |
| 8,063,139 | B2 | * | 11/2011 | Knoeppel ............... 524/773 |
| 2008/0021157 | A1 | * | 1/2008 | Sosa et al. ............... 525/70 |

FOREIGN PATENT DOCUMENTS

| EP | 0383340 | A2 | * | 8/1990 |
|---|---|---|---|---|
| EP | 0488984 | A2 | | 6/1992 |
| EP | 0528536 | A1 | * | 2/1993 |

\* cited by examiner

*Primary Examiner* — Irina S Zemel
*Assistant Examiner* — Jeffrey Lenihan

(57) ABSTRACT

A method of preparing a reaction mixture comprising a styrene monomer, an antioxidant, and a reaction rate improving additive, contacting the reaction mixture with an antioxidant reactive compound, and placing the reaction mixture under conditions suitable for polymerization of the styrene monomer to a styrenic polymer wherein the polymerization occurs at an overall reaction rate that is increased by equal to or less than 20% when compared to an otherwise similar polymerization process carried out in the absence of the reaction rate improving additive. The reaction rate improving additive can be a sodium or calcium salt of an organic acid.

18 Claims, 1 Drawing Sheet

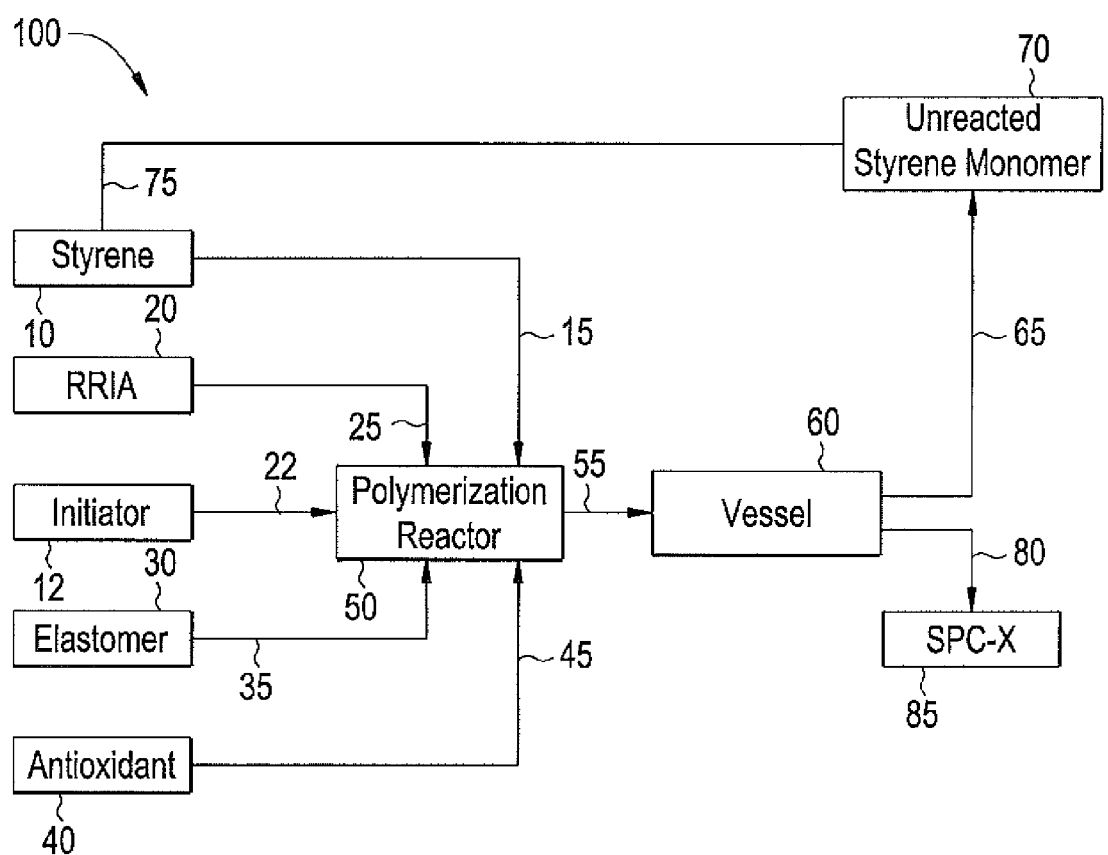

US 9,012,568 B2

METHODS OF MAKING STYRENIC POLYMERIC COMPOSITIONS AND METHODS OF USING SAME

CROSS-REFERENCE TO RELATED APPLICATIONS

This application is a continuation of U.S. patent application Ser. No. 12/357,905, filed Jan. 22, 2009.

The subject matter of the present application is related to U.S. patent application Ser. No. 11/456,297 filed Jul. 10, 2006 and entitled "Polystyrene Having Improved Color and Methods of Making Same," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure relates generally to styrenic polymer compositions and more specifically to improved methods of making styrenic polymer compositions and using same.

2. Background

Elastomer-reinforced polymers of monovinylidene aromatic compounds such as styrene, alpha-methylstyrene, and ring-substituted styrene have found widespread commercial use. For example, elastomer-reinforced styrene polymers having discrete elastomer particles and/or cross-linked elastomer dispersed throughout the styrene polymer matrix can be useful for a range of applications including food packaging, office supplies, point-of-purchase signs and displays, housewares and consumer goods, building insulation, and cosmetics packaging. Such elastomer-reinforced polymers are commonly referred to as impact modified or high impact polystyrene (HIPS) while a styrene homopolymer may be referred to as general-purpose polystyrene (GPPS).

During the production of styrenic polymer compositions, antioxidants, such as a phenol, a phosphite, or combinations thereof are generally added to the production process to stabilize the polystyrene. One challenge to the use of antioxidants in the production process is that the addition of antioxidants downstream in the production process may negatively impact downstream processing and/or affect the utility of the styrenic polymer compositions. Additionally, initiators are added to produce radical species that promote polymerization reactions. One challenge to the use of initiators in the production of styrenic polymer compositions is that the compounds may contribute to the degradation of the antioxidant thus decreasing the efficiency of the initiator when used in a polymerization reaction. Thus, it would be desirable to develop improved methodologies for preparing styrenic polymer compositions.

SUMMARY

Disclosed herein is a method comprising preparing a reaction mixture comprising a styrene monomer, an antioxidant, and a reaction rate improving additive, contacting the reaction mixture with an antioxidant reactive compound, and placing the reaction mixture under conditions suitable for polymerization of the styrene monomer to a styrenic polymer wherein the polymerization occurs at an overall reaction rate that is increased by equal to or less than 20% when compared to an otherwise similar polymerization process carried out in the absence of the reaction rate improving additive.

Also disclosed herein is a method comprising preparing a reaction mixture comprising a styrene monomer, an elastomer, an antioxidant, a sodium or calcium salt of an organic acid, and an initiator; and placing the reaction mixture under conditions suitable for polymerization of the styrene monomer to a styrenic polymer, wherein the sodium or calcium salt of an organic acid protects the initiator such that the polymerization is carried out at a reaction rate greater than would otherwise be the rate in the absence of the sodium or calcium salt of an organic acid.

BRIEF DESCRIPTION OF THE DRAWINGS

For a more complete understanding of the present disclosure and the advantages thereof, reference is now made to the following brief description, taken in connection with the accompanying drawings and detailed description:

FIG. 1 is a block diagram of a method of preparing an SPC-X.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods for the production of a styrenic polymer composition. In an embodiment, a method of preparing a styrenic polymer composition comprises contacting a reaction mixture comprising a styrene monomer, at least one antioxidant, a reaction rate improving additive (RRIA), and an antioxidant reactive compound (ARC) under conditions suitable to promote polymerization of the styrene monomer. Herein ARCs refer to compounds which undesirably react with antioxidant present in the reaction mixture such that at least a portion of the ARC is unavailable or has a reduced effectiveness for its intended purpose. ARCs will be described in more detail later herein. In such an embodiment, the method results in an increased rate of polymerization of the styrene monomer when compared to an otherwise similar method lacking a RRIA. In other embodiments, the method results in an increased amount or availability of initiator (thus, providing an improved rate of polymerization) when compared to an otherwise similar method lacking a RRIA. Hereinafter, a styrenic polymer composition produced using the methods described herein is denoted SPC-X. The SPC-X may be a polystyrene homopolymer such as general-purpose polystyrene (GPPS) or a polystyrene copolymer such as high-impact polystyrene (HIPS).

In an embodiment, the SPC-X comprises a styrenic polymer (e.g., polystyrene) formed by polymerization of styrene monomers. Styrene, also known as vinyl benzene, ethyenylbenzene, and phenylethene is an organic compound represented by the chemical formula $C_8H_8$. Styrene is widely commercially available and as used herein the term styrene (and styrenic polymer formed therefrom) includes a variety of substituted styrenes (e.g., alpha-methyl styrene), ring-substituted styrenes such as p-methylstyrene, disubstituted styrenes such as p-t-butyl styrene as well as unsubstituted styrenes.

In an embodiment, the styrene monomers may comprise virgin styrene monomers. Herein "virgin styrene monomers" refer to styrene monomers that have not been reactants in a process (e.g., polymerization). Alternatively, the styrene monomer comprises unreacted styrene monomers. Herein "unreacted styrene monomers" refer to styrene monomers that are unreacted after having been exposed to a reaction process (e.g., polymerization). For example, the unreacted styrene monomer may comprise styrene monomers recovered from the recycle stream of a polymerization reactor. In contrast to virgin styrene monomers, unreacted styrene monomers may comprise additional materials (e.g., contaminants) as a result of exposure to a reaction process. Nonlimiting examples of such contaminants include aldehydes, ethylbenzene, ketones and phenols, acetophenone, benzaldehyde, propylbenzene, alpha-methylstyrene, and benzoic acid. Unreacted styrene monomers such as those obtained from a recycle stream are commercially available and are described in more detail in U.S. Pat. No. 6,162,880, which is incorporated by reference herein in its entirety.

In an embodiment, the styrene may be a mixture of virgin styrene monomers and unreacted styrene monomers. In such an embodiment, the ratio of virgin styrene monomer:unreacted styrene monomer is from 8:1 to 2:1, alternatively from 5:1 to 2.5:1, alternatively from 4:1 to 2.5:1.

In an embodiment, the styrenic polymer is present in an amount of from 1.0 to 99.9 weight percent by total weight of the SPC-X (wt. %), alternatively from 5 wt. % to 99 wt. %, alternatively from 10 wt. % to 95 wt. %. In an embodiment, the styrenic polymer comprises the balance of the SPC-X when other ingredients are accounted for.

In some embodiments, the styrenic polymer is a styrenic copolymer comprising styrene and one or more comonomers. Examples of such comonomers may include without limitation α-methylstyrene; halogenated styrenes; alkylated styrenes; acrylonitrile; esters of (meth)acrylic acid with alcohols having from 1 to 8 carbons; N-vinyl compounds such as vinylcarbazole, maleic anhydride; compounds which contain two polymerizable double bonds such as divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in the styrenic polymer in an amount ranging from 0.025 wt. % to 99.9 wt. %, alternatively from 1 wt. % to 90 wt. %, alternatively from 1 wt. % to 50 wt. %.

In an embodiment, the SPC-X prepared by the methodologies described herein is a styrenic homopolymer, which is also referred to as a GPPS or a crystal grade polystyrene. In an embodiment, a GPPS which may be prepared by the methodologies of this disclosure has a melt flow rate of from 1 g/10 min. to 40 g/10 min., alternatively from 1.5 g/10 min. to 20 g/10 min., alternatively from 1.6 g/10 min. to 10 g/10 min. as determined in accordance with ASTM D-1238; a tensile strength of from 5,000 psi to 8,500 psi, alternatively from 6,000 psi to 8,000 psi, alternatively from 6,200 psi to 7,700 psi as determined in accordance with ASTM D-638; a tensile modulus of from 400,000 psi to 500,000 psi, alternatively from 420,000 psi to 450,000 psi as determined in accordance with ASTM D-638; an elongation of from 0% to 0.5% as determined in accordance with ASTM D-638; a flexural strength of from 10,000 psi to 15,000 psi, alternatively from 11,000 psi to 14,500 psi, alternatively from 11,500 psi to 14,200 psi as determined in accordance with ASTM D-790; a flexural modulus of from 400,000 psi to 500,000 psi, alternatively from 430,000 psi to 480,000 psi as determined in accordance with ASTM D-790; an annealed heat distortion of from 185° F. to 220° F., alternatively from 190° F. to 215° F., alternatively from 195° F. to 212° F. as determined in accordance with ASTM D-648; and a Vicat softening of from 195° F. to 230° F., alternatively from 200° F. to 228° F., alternatively from 205° F. to 225° F. as determined in accordance with ASTM D-1525.

Examples of a GPPS which may be prepared by the methodologies of this disclosure include without limitation CX5229, 525, 500B, and 585, all of which are commercially available from Total Petrochemical USA, Inc. In an embodiment, the GPPS (e.g., CX5229) has generally the physical properties set forth in Table 1.

TABLE 1

| CX5229/GPPS | ASTM Test | Typical Value |
|---|---|---|
| MELT FLOW | | |
| Flow, g/10 min., 200/5.0 | D-1238 | 3.0 |
| IMPACT PROPERTIES | | |
| Falling Dart, in-lb | D-3029 | n/a |
| Izod, ft-lbs/in, notched | D-256 | n/a |
| TENSILE PROPERTIES | | |
| Strength, psi | D-638 | 7,300 |
| Modulus, psi ($10^5$) | D-638 | 4.3 |
| Elongation, % | D-638 | n/a |
| FLEXURAL PROPERTIES | | |
| Strength, psi | D-790 | 14,000 |
| Modulus, psi ($10^5$) | D-790 | 4.7 |
| THERMAL PROPERTIES | | |
| Heat Distortion, ° F. Annealed | D-648 | |
| Vicat Softening, ° F. | D-1525 | 223 |

In some embodiments, the SPC-X is an impact polystyrene or a high impact polystyrene (HIPS) that further comprises an elastomeric material, Such HIPS may contain an elastomeric phase that is embedded in the polystyrene matrix resulting in the composition having an increased impact resistance. In an embodiment, one or more elastomers are included as comonomers with styrene to form impact or high-impact polystyrene.

In an embodiment, the SPC-X is a HIPS which is formed from the polymerization of a styrene monomer and an elastomeric comonomer. In an embodiment the elastomeric comonomer is a conjugated diene. Nonlimiting examples of conjugated diene monomers suitable for use in this disclosure are 1,3-butadiene, 2-methyl-1,3-butadiene, 2-chloro-1,3 butadiene, 2-methyl-1,3-butadiene, and 2-chloro-1,3-butadiene. Alternatively, the HIPS comprises an aliphatic conjugated diene as the elastomer. Without limitation, examples of suitable aliphatic conjugated diene monomers include $C_4$ to $C_9$ dienes such as butadiene monomers. Blends or copolymers of the dienes may also be used, far example styrene butadiene copolymers (e.g., styrene butadiene rubber (SBR)). Likewise, mixtures or blends of one or more elastomers may be used.

In an alternative embodiment the SPC-X is a HIPS wherein the elastomer comprises a homopolymer of a diene monomer, alternatively, the elastomer comprises polybutadiene. In an embodiment, the elastomer comprises a copolymer of a diene monomer; alternatively, the elastomer comprises styrene-butadiene rubber. Examples of commercially available elastomers include without limitation 730AC, which is a styrene butadiene copolymer commercially available from Firestone; and SOLPRENE 1322, which is a styrene butadiene copolymer commercially available from Dynasol. The elastomer may be present in the HIPS in amounts effective to produce one or more user-desired properties. Such effective amounts may be determined by one of ordinary skill in the art with the aid of this disclosure. In an embodiment, the elastomer may be present in the HIPS in an amount of from 2 wt. % to 18 wt. %, alternatively from 4 wt. % to 15 wt. %, alternatively from 6 wt. % to 13 wt. %.

In an embodiment, a HIPS prepared by the methodologies of this disclosure has a melt flow rate of from 1 g/10 min. to 40 g/10 min., alternatively from 1.5 g/10 min, to 20 g/10 min., alternatively from 2 g/10 min. to 15 g/10 min. as determined in accordance with ASTM D-1238; a falling dart impact of from 5 in·lb to 200 in·lb, alternatively from 50 in·lb to 180 in·lb, alternatively from 100 in·lb to 150 in·lb as determined in accordance with ASTM D-3029; an Izod impact of from 0.4 ft-lbs/in to 5 ft-lbs/in, alternatively from 1 ft-lbs/in to 4 ft-lbs/in, alternatively from 2 ft-lbs/in to 3.5 ft-lbs/in as determined in accordance with ASTM D-256; a tensile strength of from 2,000 psi to 10,000 psi, alternatively from 2,800 psi to 8,000 psi, alternatively from 3,000 psi to 5,000 psi as determined in accordance with ASTM D-638; a tensile modulus of from 100,000 psi to 500,000 psi, alternatively from 200,000 psi to 450,000 psi, alternatively from 250,000 psi to 380,000 psi as determined in accordance with ASTM D-638; an elongation of from 0.5% to 90%, alternatively from 5% to 70%, alternatively from 35% to 60% as determined in accordance with ASTM D-638; a flexural strength of from 3,000 psi to 15,000 psi, alternatively from 4,000 psi to 10,000 psi, alternatively from 6,000 psi to 9,000 psi as determined in accordance with ASTM D-790; a flexural modulus of from 200,000 psi to 500,000 psi, alternatively from 230,000 psi to 400,000 psi, alternatively from 250,000 psi to 350,000 psi as determined in accordance with ASTM D-790; an annealed heat distortion of from 180° F. to 215° F., alternatively from 185° F. to 210° F., alternatively from 190° F. to 205° F. as determined in accordance with ASTM D-648; a Vicat softening of from 195° F. to 225° F., alternatively from 195° F. to 220° F., alternatively from 200° F. to 215° F. as determined in accordance with ASTM D-1525; and a gloss 60° of from 30 to 100, alternatively from 40 to 98, alternatively from 50 to 95 as determined in accordance with ASTM D-523.

Examples of HIPS that may be prepared by the methodologies of this disclosure include without limitation 825E, 680, 830, 935E, 975E, 945E, and 845E, all of which are high impact polystyrenes commercially available from Total Petrochemical USA, Inc. In an embodiment, the HIPS (e.g., 825E) have generally the physical properties set forth in Table 2.

TABLE 2

| 825E | ASTM Test | Typical Value |
|---|---|---|
| MELT FLOW | | |
| Flow, g/10 min., 200/5.0 | D-1238 | 3.0 |
| IMPACT PROPERTIES | | |
| Falling Dart, in-lb | D-3029 | 110 |
| Izod, ft-lbs/in, notched | D-256 | 2.3 |
| TENSILE PROPERTIES | | |

TABLE 2-continued

| 825E | ASTM Test | Typical Value |
|---|---|---|
| Strength, psi | D-638 | 3,600 |
| Modulus, psi ($10^5$) | D-638 | 3 |
| Elongation, % | D-638 | 50 |
| FLEXURAL PROPERTIES | | |
| Strength, psi | D-790 | 6,900 |
| Modulus, psi ($10^5$) | D-790 | 3.2 |
| THERMAL PROPERTIES | | |
| Heat Distortion, ° F. Annealed | D-648 | 202 |
| Vicat Softening, ° F. | D-1525 | 215 |
| OTHER PROPERTIES | | |
| Gloss, 60° | D-523 | 70 |

In an embodiment, a reaction mixture for the preparation of an SPC-X further comprises an antioxidant. The antioxidant may be included in the reaction mixture as an additive or may be present in the commercial formulations of other reagents for use in the production of the SPC-X. For example, many commercial formulations of elastomers (e.g., for use in HIPS) include at least one antioxidant as a stabilizer. In an embodiment, the antioxidant is a phenol, a phosphite, or combinations thereof. Such antioxidants may react with metals (e.g., iron or zinc) or metal compounds present in the reaction mixture (e.g., iron or zinc containing compounds). Nonlimiting examples of antioxidants suitable for use in this disclosure include tris-nonylphenylphosphite (TNPP); 2,6 ditertiarybutyl-4-methyl phenol (BHT); octadecyl 3,5-di-(tert)-butyl-4-hydroxyhydrocinnamate which is commercially available as IRGANOX 1076 from Ciba; 4-bis[(octylthio)methyl]-o-cresol which is commercially available as IRGANOX 1520 from Ciba; or combinations thereof. In an embodiment, the SPC-X may contain an antioxidant in amounts of from 250 ppm to 5000 ppm, alternatively from 500 ppm to 4000 ppm, alternatively from 750 ppm to 3000 ppm.

In an embodiment, the SPC-X comprises an RRIA. The RRIA may be the salt of an organic acid, an alkali metal salt (e.g., sodium) of an organic acid, an alkaline earth metal salt (e.g., calcium) of an organic acid, an alkali or alkaline earth metal salt of lactic acid, derivates thereof, or combinations thereof; alternatively sodium stearoyl lactate, alternatively calcium stearoyl lactate (CSL). In an embodiment, the RRIA is CSL. CSL, which is widely commercially available, may be obtained by combining lactic acid and stearic acid and then reacting the product with calcium hydroxide to produce the calcium salt. Over-based forms such as those that limit the level of acid may also be employed. A nonlimiting example of a CSL suitable for use in this disclosure includes PATIONIC 930, which is commercially available from Caravan Ingredients Co.

In an embodiment, the RRIA is present in the reaction mixture for preparation of the SPC-X in an amount of from 200 ppm to 2500 ppm, alternatively from 250 ppm to 1500 ppm, alternatively from 400 ppm to 1000 ppm, with all ppm values stated herein by weight of the reaction mixture unless otherwise indicated.

In an embodiment, the reaction mixture for preparation of the SPC-X may comprise an ARC. Alternatively, the ARC may be introduced to the production process for preparation of the SPC-X prior to pelletization of the SPC-X. In an embodiment, the ARC comprises an acid neutralizer. Acid neutralizers may aid in the processing of polymer resins by neutralizing acidic sites. Examples of acid neutralizers include without limitation metallic stearates such as zinc stearate, calcium stearate, synthetic neutralizers such as synthetic hydrotalcite, or combinations thereof. In an embodiment, the SPC-X comprises a metallic stearate such as zinc stearate. Such metallic stearates may also aid in mold release by acting as lubricants. In an embodiment, an acid neutralizer may be present in the reaction mixture for preparation of the SPC-X in amounts of from 0 ppm to 3000 ppm, alternatively from 100 ppm to 2500 ppm, alternatively from 400 ppm to 2000 ppm, with all ppm values stated herein by weight of the reaction mixture unless otherwise indicated.

In an embodiment, the SPC-X comprises an initiator or the byproducts of an initiator reaction. Such initiators may also function as ARCs. Initiators, sometimes referred to as accelerators, are compounds that function as the source of free radicals to enable the polymerization of styrene. In an embodiment, any initiator capable of free radical formation that facilitates the polymerization of styrene may be employed. Such initiators are well known in the art and include by way of example and without limitation organic peroxides. Examples of organic peroxides useful for polymerization initiation include without limitation diacyl peroxides, peroxydicarbonates, monoperoxycarbonates, peroxyketals, peroxyesters, dialkyl peroxides, hydroperoxides, or combinations thereof. A nonlimiting example of an initiator suitable for use in this disclosure includes without limitation LUPEROX 233 (L233), which is ethyl 3,3-d(t-butylperoxy) butyrate commercially available from Arkema. The selection of initiator and effective amount will depend on numerous factors (e.g., temperature, reaction time) and can be chosen by one skilled in the art with the aid of this disclosure to meet the desired needs of the process. For example, the initiator may be present in an amount of from 0.001 wt. % to 0.5 wt. %, alternatively from 0.005 wt. % to 0.1 wt. %, alternatively from 0.01 wt. % to 0.1 wt. %, alternatively from 0.1 wt. % to 0.5 wt. %, alternatively less than 0.1 wt. %.

In an embodiment, the SPC-X contains other additives to impart desired physical properties, such as, increased gloss or color. Examples of additives include without limitation stabilizers, chain transfer agents, antioxidants, UV stabilizers, lubricants, plasticizers, ultra-violet screening agents, oxidants, anti-oxidants, anti-static agents, ultraviolet light absorbents, fire retardants, processing oils, mineral oil, mold release agents, coloring agents, pigments/dyes, fillers, and/or other suitable additives. The aforementioned additives may be used either singularly or in combination to form various formulations of the styrenic polymeric composition. For example, stabilizers or stabilization agents may be employed to help protect the SPC-X from degradation due to exposure to excessive temperatures and/or ultraviolet light. These additives may be included in amounts effective to impart the desired properties. Effective additive amounts and processes for inclusion of these additives to styrenic polymeric compositions may be determined by one skilled in the art with the aid of this disclosure.

Any process known to one of ordinary skill in the art with the aid of this disclosure for the production of an SPC-X may be employed. In an embodiment, an SPC-X comprising a HIPS is prepared from a reaction mixture comprising styrene, an RRIA, an elastomer formulation having at least one antioxidant, an initiator, and optionally other additives as described herein previously. In an embodiment, a reaction mixture for the production of an SPC-X may comprise from 80 wt. % to 99.9 wt. % styrene, from 0.001 wt. % to 0.1 wt. % initiator, from 0.02 wt. % to 0.25 wt. % RRIA (e.g., CSL), and optionally additional components as needed to impart the desired physical properties. The percent values given are percentages by weight of the total composition. Alternatively, for the production of a high impact styrenic copolymer the reaction mixture may comprise from 80 wt. % to 99 wt. % styrene, from 2 wt. % to 16 wt. % elastomer, from 0.001 wt. % to 0.1 wt. % initiator, from 0.02 wt. % to 0.25 wt. % RRIA (e.g., CSL), and optionally additional components as needed to impart the desired physical properties. The source of styrene may be virgin styrene monomers and/or unreacted styrene monomers. In an embodiment, the source of styrene may be a combination of virgin styrene monomers and unreacted styrene monomers having a virgin styrene monomer:unreacted styrene monomer ratio of from 8:1 to 2:1. Said reaction mixture may be introduced to a polymerization reactor system to allow for the production of the SPC-X.

In an embodiment, the polymerization of styrene is carried out in a solution or mass polymerization process. Mass polymerization, also known as bulk polymerization refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The polymerization process can be either batch or continuous. In an embodiment, the polymerization reaction may be carried out using a continuous production process in a polymerization apparatus comprising a single reactor or a plurality of reactors. For example, the SPC-X can be prepared using an upflow reactor. Reactors and conditions for the production of an SPC-X are disclosed in U.S. Pat. No. 4,777,210, which is incorporated by reference herein in its entirety.

The temperature ranges useful with the process of the present disclosure can be selected to be consistent with the operational characteristics of the equipment used to perform the polymerization. In one embodiment, the temperature range for the polymerization can be from 90° C. to 240° C. In another embodiment, the temperature range for the polymerization can be from 100° C. to 180° C. In yet another embodiment, the polymerization reaction may be carried out in a plurality of reactors with each reactor having an optimum temperature range. For example, the polymerization reaction may be carried out in a reactor system employing a first and second polymerization reactors that are either continuously stirred tank reactors (CSTR) or plug-flow reactors. The first polymerization reactor may be referred to herein as the prepolymerization reactor. In an embodiment, a polymerization reactor for the production of an impact-modified styrene comprising a plurality of reactors may have the first reactor (e.g., a CSTR), also known as the prepolymerization reactor, operated in the temperature range of from 90° C. to 135° C. while the second reactor (e.g., CSTR or plug flow) may be operated in the range of from 100° C. to 165° C.

The polymerized product effluent from the first reactor may be referred to herein as the prepolymer. In an embodiment, the residence time or the amount of time the reaction mixture is held within the reactor system may range from 0.5 to 14 hours, alternatively from 1 to 8 hours, alternatively from 2 to 5 hours. When the prepolymer reaches the desired conversion, it may be passed through a heating device into a second reactor for further polymerization. The polymerized product effluent from the second reactor may be further processed as is known to one of ordinary skill in the art and described in detail in the literature. Processes and equipment for the production of a HIPS are disclosed in U.S. patent application Ser. No. 11/384,737 entitled "Reactor System for the Production of High Impact Polystyrene" and U.S. patent application Ser. No. 11/384,596 entitled "Horizontal Boiling Plug Flow Reactor," both filed Mar. 20, 2006, and are incorporated by reference herein in their entirety.

In an embodiment, the SPC-X is produced by a continuous flow utilizing a pre-inversion reactor in which a solution of styrene and rubber are polymerized to a point below the inversion and then introduced into a second stirred tank reactor. The viscosity of the solutions in the pre-inversion and in the second stirred tank reactor are closely controlled to produce meet user and/or process desired needs. This process is disclosed in more detail in U.S. Pat. No. 4,777,210 which is hereby incorporated by reference herein in its entirety.

In an embodiment, the RRIA is present in the reaction mixture prior to or concomitant with the introduction of an ARC and antioxidant. Without limitation examples of ARCs include acid neutralizers (e.g., metal stearates), initiators, air, or combinations thereof.

In an embodiment, the RRIA may be included in the reaction mixture which enters the prepolymerization reactor. In such an embodiment, the reaction mixture comprises an initiator which may function as an ARC and react with at least a portion of the antioxidant. As will be understood by one of ordinary skill in the art, the reaction of the initiator and ARC will decrease both the amount of antioxidant and the amount of initiator in the reaction mixture. The loss of initiator to reaction with the antioxidant will lower the efficiency with which the initiator functions for its intended purpose. In an embodiment, the RRIA is introduced to the reaction mixture prior to, alternatively concomitant with the introduction of the ARC (e.g., initiator). The presence of the RRIA may reduce the reactivity of the initiator with the antioxidant thereby increasing the efficiency of the initiator when compared to an otherwise similar polymerization reaction carried out in the absence of an RRIA.

The polymeric composition emerging from the prepolymerization reactor may then enter a second reactor such as described previously or other reactor located downstream of the prepolymerization reactor where other ARCs such as acid neutralizers are typically introduced. The presence of the RRIA (e.g., CSL) may prevent or inhibit the ARCs (e.g., initiator, metallic stearates) from reacting with the antioxidant and reducing the amount of antioxidant present to prevent degradation of the polymeric product.

The reaction mixtures may be subjected to solution or mass polymerization processes such that the residence time of the mixture components may range from 0.5 to 14 hours, alternatively from 1 to 8 hours, alternatively from 2 to 5 hours in a temperature range of from 90° C. to 240° C., alternatively from 90° C. to 180° C., alternatively from 100° C. to 165° C. In some embodiments, the SPC-X is a HIPS and the RRIA may be introduced to the polymerization process concomitant with the dissolution of the elastomer. In an alternative embodiment, the RRIA may be incorporated into the reaction mixture that is to be fed to the polymerization reactor (i.e., the feed). In such embodiments, the RRIA may be present in the feed at ambient temperature for greater than 48 hours prior to use. In other embodiments, the RRIA may be introduced to the polymerization process at some point downstream of the first polymerization reactor. In an alternative embodiment, the RRIA may be introduced to the polymerization process at some time subsequent to the dissolution of the elastomer. Additional details regarding solution or mass polymerization processes and residence times have been previously described herein.

In an embodiment, a metallic stearate (e.g., ZnSt) and antioxidants (e.g., IRGANOX 1076) may be present in the reaction mixture in the amounts previously described herein. In an embodiment, the antioxidant is introduced indirectly to the reaction mixture as a component in the elastomer formulation and the RRIA may be contacted with the reaction mixture (e.g., monomer) prior to addition of the elastomer formulation. In such embodiments, the final antioxidant concentration in the HIPS originating from the elastomer may be in the amounts previously described herein.

In embodiments wherein the antioxidant is present as part of the elastomer formulation, the amount of antioxidant present during the SPC-X polymerization process may increase during the course of the reaction as a result of the accumulation of the antioxidant in other portions of the polymerization reactor, as shown in FIG. 1. Referring to FIG. 1, styrene 10, initiator 12, an RRIA 20, elastomer 30, and at least one antioxidant 40 are fed into a polymerization reactor 50 via lines 15, 22, 25, 35, and 45, respectively, and polymerized to allow for the formation of SPC-X 85. In alternative embodiments, one or more of the components introduced via separate lines 15, 22, 25, 35, and/or 45 may be combined upstream of polymerization reactor 50 prior to introduction to polymerization reactor 50.

In the polymerization reactor 50, a polymerization process may have a percent conversion of styrene 10 to SPC-X 85 that varies from 60% to 80% leaving a significant amount of unreacted styrene monomers 70 and diluent such as ethylbenzene. The unreacted styrene monomers 70 may be separated from SPC-X 85 by feeding them via line 55 into a vessel 60 where a process known as devolatilization is carried out at high reaction temperatures and low vapor pressures. The reaction temperatures and pressures necessary for devolatilization will depend to some extent on the nature of the vessel 60 and may be determined by one of ordinary skill in the art with the aid of this disclosure. After devolatilization, SPC-X 85 may be recovered via line 80 and unreacted styrene monomer 70 (and optionally a diluent such as ethylbenzene) may be recycled via recycle streams 65 and 75 into styrene 10. In an embodiment, styrene 10 is virgin styrene monomer that is combined with unreacted styrene monomer 70. Alternatively, recycle stream 75 may be added, wholly or in part, directly to polymerization reactor 50.

In an embodiment the reaction mixture comprises styrene 10, an RRIA 20, antioxidant 40, and an elastomer 30. Antioxidant 40 may be present in the elastomer 30 and/or may be added directly to the reaction mixture. In such an embodiment, at least a portion of the styrene monomer 10 may comprise unreacted styrene monomer 70. In such an embodiment, while the final concentration of antioxidant in the SPC-X 85 reaction mixture may be in the ranges described herein previously, the antioxidant 40 may accumulate to a concentration of from 50 ppm to 200 ppm, alternatively from 50 ppm to 150 ppm, alternatively from 80 ppm to 100 ppm in recycle streams 65 and 75.

In an embodiment, the polymerization reaction is carried out in a reactor system comprising a plurality of reactors. In one embodiment, both a metallic stearate (e.g., ZnSt) and an RRIA (e.g., CSL) are introduced to the reactor system in which a polymerization reaction is occurring, such as the polymerization of styrene monomer to form a HIPS or a GPPS. Introduction of the metallic stearate may occur downstream of the introduction of the RRIA. In such embodiments, the RRIA may function to increase the polymerization reaction rate and may be present prior to contacting the reaction mixture with any additional ARCs.

In an embodiment, a polymerization process of the type described herein displays an overall reaction rate increase of equal to or less than 20%, alternatively from 1% to 20%, alternatively from 5% to 20%, alternatively from 5% to 15%, alternatively from 5% to 10%, when compared to an otherwise similar process carried out in the absence of an RRIA. In some embodiments, the reaction rate during the course of the polymerization reaction may be monitored. In such embodiments, polymerization reactions carried out in the presence of the RRIA will display increases of greater than 20% in the reaction rate when compared to an otherwise similar reaction early in the reaction. The reaction rate may decrease over the course of the polymerization reaction such that the increase in the overall reaction rate falls within the ranges disclosed previously herein. In another embodiment, the activity of the initiator in a polymerization reaction may increase from 25% to 70%, alternatively from 25% to 60%, alternatively from 25% to 50% when compared to an otherwise similar polymerization reaction carried out in the absence of an RRIA. The RRIA may serve to "protect" the initiator from reactions with the antioxidants such that a greater portion of the initiator is available for reaction.

In an embodiment, a polymerization process of the type described herein displays a final percentage conversion of from 60% to 80%, alternatively from 63% to 77%, alternatively from 65% to 75%. The final percentage conversion is determined by the solids remaining after removal of volatiles divided by the total mass including volatiles ×100.

The SPC-X of this disclosure may be converted to end-use articles by any suitable method. In an embodiment, this conversion is a plastics shaping process such as blowmoulding, extrusion, injection blowmoulding, injection stretch blowmoulding, thermoforming, and the like. Examples of end use articles into which the SPC-X may be formed include food packaging, office supplies, plastic lumber, replacement lumber, patio decking, structural supports, laminate flooring compositions, polymeric foam substrate; decorative surfaces (e.g., crown molding, etc.) weatherable outdoor materials, point-of-purchase signs and displays, house wares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth.

EXAMPLES

The embodiments having been generally described, the following examples are given as particular embodiments of the disclosure and to demonstrate the practice and advantages thereof. It is understood that the examples are given by way of illustration and are not intended to limit the specification of the claims in any manner.

Example 1

The polymerization rates for the production of an SPC-X of the type described herein were investigated. Eight samples, designated Samples 1-8, were prepared. The samples were polymerized to form HIPS from feed solutions containing approximately 96 wt. % of styrene monomer from Total Petrochemicals, 170 ppm of LUPEROX 233 (L233) initiator, 4 wt. % elastomer of either 730AC (Samples 1-4) or 1322 (Samples 5-8), 1000 ppm of IRGANOX 1076, 800 ppm of ZnSt, PATIONIC 930 of either 0 ppm (Samples 1, 3, 5, and 7) or 500 ppm (Samples 2, 4, 6, and 8). Samples 3, 4, 7, and 8 also contained 25 wt. % recycled styrene. In the samples containing recycled styrene, the amount of styrene in the recycle was estimated and so the total styrene will be in the range of less than 96 wt. % and approximately 87 wt. %.

L233 is ethyl 3,3-d(t-butylperoxy)butyrate commercially available from ARKEMA, which serves as an organic peroxide initiator. IRGANOX 1076 is octadecyl 3,5-Di-(tert)-butyl-4-hydroxyhydrocinnamate which is a antioxidant commercially available from Ciba. PATIONIC 930 is CSL, which is an additive commercially available from Caravan Ingredients Co.

Polymerization of the styrene monomers was carried out under the following conditions: the polybutadiene was dissolved in styrene monomer or styrene monomer/recycle styrene overnight at ambient conditions. To this solution L-233 initiator, IRGANOX 1076, zinc stearate, and CSL were added to give a 200 g solution in a 500 ml reaction vessel equipped with 4 indentations. The system is equipped with a 3-necked flask head and purged with dry nitrogen. The solution is mixed with an overhead agitator equipped with a flat paddle stirrer. The reaction mixture is then heated in an oil bath at 110° C. for 2 hours, 130° C. for 1 hour, and 150° C. for one hour. The polymer sample containing approximately 30% volatiles (oligomers, styrene monomer, and ethylbenzene in the case of recycle) is then devolatilized at 225° C. for 30 minutes in a vacuum oven at less than 10 torr. The conversions at 1 hour at 110° C., 2 hours at 110° C., 3 hours at 130° C., and final conversions at 150° C. of each sample were monitored. The average reaction rates were determined by measuring the percent solids on a moisture balance and dividing by the elapsed time. The reaction rates of Samples 2, 4, 6, and 8 were compared to the reaction rates of the control samples (i.e., not containing an RRIA), Samples 1, 3, 5, and 7, respectively. The components of Samples 1-8, conversion percentages at the indicated time points, average rate, and relative rate were determined and are presented in Table 3.

TABLE 3

| | Sample No. | | | | | | | |
|---|---|---|---|---|---|---|---|---|
| | 1 | 2 | 3 | 4 | 5 | 6 | 7 | 8 |
| Initiator | L233 | L233 | L233 | L233 | L233 | L233 | L233 | L233 |
| Initiator Concentration (ppm) | 170 | 170 | 170 | 170 | 170 | 170 | 170 | 170 |
| Elastomer Type | 730AC | 730AC | 730AC | 730AC | 1322 | 1322 | 1322 | 1322 |
| Wt. % Elastomer in Feed | 4 | 4 | 4 | 4 | 4 | 4 | 4 | 4 |
| Antioxidant Concentration (ppm) | 1,000 | 1,000 | 1,000 | 1,000 | 1,000 | 1,000 | 1,000 | 1,000 |
| ZnSt Concentration (ppm) | 800 | 800 | 800 | 800 | 800 | 800 | 800 | 800 |
| PATIONIC 930 | 0 | 500 | 0 | 500 | 0 | 500 | 0 | 500 |

TABLE 3-continued

| | Sample No. | | | | | | | |
|---|---|---|---|---|---|---|---|---|
| | 1 | 2 | 3 | 4 | 5 | 6 | 7 | 8 |
| Concentration (ppm) | | | | | | | | |
| Wt. % Recycle | 0 | 0 | 25 | 25 | 0 | 0 | 25 | 25 |
| 1 hour conversion (% Conversion at 110° C.) | 4.05 | 4.05 | 3.07 | 2.81 | 4.39 | 4.02 | 3.29 | 3.52 |
| 2 hour conversion (% Conversion at 110° C.) | 4.35 | 5.05 | 3.88 | 4.85 | 4.20 | 6.23 | 3.51 | 7.27 |
| 3 hour conversion (% Conversion at 130° C.) | 32.42 | 47.96 | 18.43 | 29.03 | 38.05 | 55.6 | 28.28 | 38.21 |
| Final conversion (% Conversion at 150° C.) | 70.37 | 74.13 | 63.0 | 70.14 | 73.7 | 77.78 | 67.11 | 71.96 |
| Average Reaction Rate (% PS/hour) | 19.2 | 20.2 | 15.8 | 17.5 | 19.7 | 20.7 | 16.8 | 18.0 |
| Relative Reaction Rate vs. Control | 1 | 1.05 | 1 | 1.10 | 1 | 1.05 | 1 | 1.07 |

The results demonstrate that samples containing the RRIA, CSL, (i.e., Samples 2, 4, 6, and 8) displayed an increased average reaction rate when compared to samples lacking an RRIA (i.e., Samples 1, 3, 5, and 7).

The results demonstrated that the overall reaction rates were increased in the presence of the RRIA by 5-11%. The results further demonstrated that at 130° C. which is similar to the 1 hour half life temperature for L-233 the difference in the reaction rates between samples containing the RRIA (i.e., PATIONIC 93) was significant.

Example 2

The effects of the RRIA on the aging of Samples 1-8 prepared as described in Example 1 were investigated. The samples were aged by placing in an oven under a nitrogen purge at 145° C. and the extent of aging determined by measuring the yellowness index (YI). The YI of the aged samples were measured using a Hunter colorimeter as determined in accordance with ASTM Method E313 after aging for 0, 4, and 18 hours. The results of the color measurements are presented in Table 4.

TABLE 4

| YI at | 1 | 2 | 3 | 4 | 5 | 6 | 7 | 8 |
|---|---|---|---|---|---|---|---|---|
| 0 hour | 4.46 | −1.38 | 16.64 | 1.48 | 7.01 | −1.76 | 10.81 | −0.34 |
| 4 hours | 20.62 | 15.65 | 37.21 | 11.57 | 21.92 | 9.72 | 26.79 | 6.93 |
| 18 hours | 52.85 | 55.61 | 70.83 | 41.72 | 55.85 | 49.48 | 57.37 | 37.02 |

The results demonstrated that with the addition of CSL for Samples 2, 4, 6, and 8, there were significant reductions in aging as evidenced by the negative or low YI values.

While various embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
preparing a reaction mixture comprising a styrene monomer, an antioxidant, a reaction rate improving additive, and an antioxidant reactive compound, wherein the reaction rate improving additive is calcium stearoyl lactylate; and
placing the reaction mixture under conditions suitable for polymerization of the styrene monomer to a styrenic polymer and monitoring the reaction rate during polymerization, wherein the polymerization occurs at an overall reaction rate that is increased by greater than 20% when compared to an otherwise similar polymerization process carried out in the absence of the reaction rate improving additive;
wherein the styrene monomer comprises a virgin styrene monomer and an unreacted styrene monomer, wherein the virgin styrene monomer and the unreacted styrene monomer have a ratio of virgin styrene monomer:unreacted styrene monomer of from 8:1 to 2:1.

2. The method of claim 1 wherein the reaction rate improving additive is present in an amount of from 200 ppm to 2500 ppm.

3. The method of claim 1 wherein the styrene comprises a substituted styrene, a ring-substituted styrene, a disubstituted styrene, an unsubstituted styrene, or combinations thereof.

4. The method of claim 1 wherein the styrene is present in an amount of from 1 wt. % to 99.9 wt. %.

5. The method of claim 1 wherein the reaction mixture further comprises an elastomer.

6. The method of claim 5 wherein the elastomer is a polymer or copolymer of an aliphatic conjugated diene.

7. The method of claim 6 wherein the aliphatic conjugated diene is a butadiene.

8. The method of claim 5 wherein the elastomer is present in an amount of from 2 wt. % to 18 wt. %.

9. The method of claim 1 wherein the antioxidant comprises a phenol, a phosphite, tris-nonylphenylphosphite, 2,6 ditertiarybutyl-4-methyl phenol, octadecyl 3,5-di-(tert)-butyl-4-hydroxyhydrocinnamate, 4-bis[(octylthio)methyl]-o-cresol, or combinations thereof.

10. The method of claim 1 wherein the antioxidant is present in an amount of from 250 ppm to 5000 ppm.

11. The method of claim 1 wherein the antioxidant reactive compound comprises an acid neutralizer, air, an initiator, or combinations thereof.

12. The method of claim 11 wherein the acid neutralizer comprises metallic stearate, zinc stearate, calcium stearate, synthetic neutralizer, synthetic hydrotalcite, derivatives thereof, or combinations thereof.

13. The method of claim 11 wherein the acid neutralizer is present in an amount of from 0 ppm to 3000 ppm.

14. The method of claim 11 wherein the initiator comprises diacyl peroxides, peroxydicarbonates, monoperoxycarbonates, peroxyketals, peroxyesters, dialkyl peroxides, hydroperoxides, ethyl 3,3-d(t-butylperoxy)butyrate, or combinations thereof.

15. The method of claim 11 wherein an activity of the initiator is increased by from 25% to 70% when compared to an otherwise similar reaction carried out in the absence of a reaction rate improving additive.

16. A method comprising:
preparing a reaction mixture comprising a styrene monomer, an elastomer, an antioxidant, calcium stearoyl lactylate, and an initiator; and
placing the reaction mixture under conditions suitable for polymerization of the styrene monomer to a styrenic polymer, wherein the calcium stearoyl lactylate protects the initiator such that an activity of the initiator during polymerization is increased from 25% to 60% when compared to an otherwise similar polymerization reaction carried out in the absence of the calcium stearoyl lactylate;
wherein the styrene monomer comprises a virgin styrene monomer and an unreacted styrene monomer, wherein the virgin styrene monomer and the unreacted styrene monomer have a ratio of virgin styrene monomer:unreacted styrene monomer of from 8:1 to 2:1.

17. A method comprising:
preparing a reaction mixture comprising a styrene monomer, an antioxidant, a reaction rate improving additive, and an antioxidant reactive compound, wherein the reaction rate improving additive is calcium stearoyl lactylate; and
placing the reaction mixture under conditions suitable for polymerization of the styrene monomer to a styrenic polymer;
wherein the styrene monomer comprises a virgin styrene monomer and an unreacted styrene monomer, wherein the virgin styrene monomer and the unreacted styrene monomer have a ratio of virgin styrene monomer:unreacted styrene monomer of from 8:1 to 2:1.

18. The method of claim 17, wherein the styrenic polymer is polystyrene homopolymer.

* * * * *